United States Patent [19]

Kawai

[11] Patent Number: 4,717,303

[45] Date of Patent: Jan. 5, 1988

[54] JOINT MECHANISM FOR MANIPULATORS

[75] Inventor: Seiji Kawai, Ogaki, Japan

[73] Assignees: Kabushiki Kaisha Meidensha; Doryokuro Kakunenryo Kaihatsu Jigyodan, both of Tokyo, Japan

[21] Appl. No.: 832,270

[22] Filed: Feb. 21, 1986

[30] Foreign Application Priority Data

Feb. 25, 1985 [JP] Japan .............................. 60-25885[U]
Feb. 25, 1985 [JP] Japan .............................. 60-25886[U]

[51] Int. Cl.⁴ ............................................ B25J 11/00
[52] U.S. Cl. ........................................ 414/4; 414/1;
414/719; 901/26; 901/15; 901/19; 901/48
[58] Field of Search ................. 901/26, 25, 15, 23,
901/19, 28, 48, 14, 24; 414/1, 2, 4, 7, 719, 735

[56] References Cited

U.S. PATENT DOCUMENTS

| 2,061,256 | 11/1936 | Romano | 901/26 X |
|---|---|---|---|
| 2,858,947 | 11/1958 | Chapman | 414/5 |
| 3,272,347 | 9/1966 | Lemelson | 414/735 X |
| 3,817,403 | 6/1974 | Glachet et al. | 414/735 |
| 3,922,930 | 12/1975 | Fletcher et al. | 74/665 B |
| 4,062,455 | 12/1977 | Flatau | 414/735 |
| 4,507,043 | 3/1985 | Flatau | 901/15 X |

FOREIGN PATENT DOCUMENTS

| 1537663 | 4/1965 | France. |
|---|---|---|
| 2155848 | 5/1973 | France. |
| 2183583 | 12/1973 | France. |
| 2450673 | 10/1980 | France. |
| 2521056 | 8/1983 | France. |
| 52-73463 | 6/1977 | Japan. |
| 2115779 | 9/1983 | United Kingdom. |
| 573339 | 10/1977 | U.S.S.R.. |
| 763082 | 9/1980 | U.S.S.R.. |

Primary Examiner—Robert J. Spar
Assistant Examiner—Jay I. Alexander
Attorney, Agent, or Firm—Bachman & LaPointe

[57] ABSTRACT

A joint mechanism for a manipulator movable in the manner similar to human shoulder and elbow joints is disclosed. The joint mechanism comprises three actuators mounted on a shoulder frame, a first gear assembly for moving the shoulder frame back and forth when the first actuator is driven, a second gear assembly for moving the upper and lower arms clockwise or counterclockwise when the second actuator is driven, and a third gear assembly for moving only the lower arm back and forth or up and down when the third actuator is driven. Further, a balance weight and its gear assembly are attached and driven by the third actuator to keep weight balance of the moved lower arm. A fourth actuator and its gear assembly are disclosed for further moving the shoulder frame right and left.

11 Claims, 4 Drawing Figures

JOINT MECHANISM FOR MANIPULATORS

BACKGROUND OF THE INVENTION

1. Field of the Invention

The present invention relates to a joint mechanism used with robots, manipulators, etc., and more specifically to the joint mechanism for driving right and left upper arms and lower arms freely and independently in multi-directions.

2. Description of the Prior Art

In robots or manipulators, there are provided mechanisms for driving shoulder joints to move upper arms and mechanisms for driving elbow joints to move only lower arms. Actuators or motors included in these mechanisms are usually arranged concentratively at a position (called concentrated actuator arrangement system) or separately at some positions (called separated actuator arrangement system).

In the concentrated actuator arrangement system, the motors are concentratedly disposed on an appopriate position and one joint is driven by way of the other joints. Therefore, when the upper or lower arms are required to drive in predetermined directions, there exist problems in that plural joints should be driven simultaneously. That is, it is impossible to drive a joint independently without relation to other joints or without interference in movement between joints.

In the separated actuator arrangement system, since each motor is arranged at each joint, there exist problems in that it is rather difficult to keep balance of the arm in relation to the motor weight. Further, the balance weight is inevitably increased, thus causing an increase in dimensions or weight. In addition, another problem arises such that when the weight of the arm increases, it is necessary to increase the rigidity of the arms so that the arm can withstand acceleration or deceleration caused when moved quickly.

In addition, there exists another manipulator such that the shoulder joint is only pivoted and the drive shaft is arranged eccentrically with respect to the center line of the arm. In the manipulator of this type, since the rotational axis of the upper arm about the shoulder joint and the pivotal axis thereof in the back and forth direction are located at two different positions, it is difficult to manipulate or operate the manipulator by use of operation rods in the case of feedback control system.

In summary, it is ideal to construct and operate the manipulator joints as humanly as possible. In practice, the shoulder joint should be such that the pivotal axis of the arm is located on a straight line connecting the shoulder and the hand or fingers and the arm is pivoted about a horizontal pivotal axis perpendicular to the above straight line.

In the prior-art manipulators, it has been difficult to realize a humanized shoulder joint motion and a humanized elbow joint motion. In other words, there exists no manipulator easy for the operator to handle in accordance with human sense.

SUMMARY OF THE INVENTION

With these problems in mind, therefore, it is the primary object of the present invention to provide a joint mechanism for driving the upper and lower arms used with a robot or manipulator which is constructed and operable as humanly as possible.

To achieve the above-mentioned object, the joint mechanism for a manipulator including a manipulator base, a shoulder frame, an upper arm, and a lower arm according to the present invention comprises (a) a first motor mounted on the shoulder frame; (b) a second motor mounted on the shoulder frame; (c) a third motor mounted on the shoulder frame; (d) a first gear assembly housed within the shoulder frame for moving the shoulder frame back and forth together with the upper and lower arms when said first motor moves; (e) a second gear assembly housed within the shoulder frame for moving the upper and lower arms clockwise and counterclockwise when said second motor moves; and (f) a third gear assembly housed within the lower arm for moving the lower arm back and forth or up and down relative to the upper arm when said third motor moves.

In the joint mechanism for a manipulator according to the present invention, the shoulder frame can be pivoted back and forth about its axis by the first motor; the upper and lower arms can be rotated clockwise and counterclockwise within 360° about the axis of the upper arm by the third motor. These motions are effected respectively and independently.

Further, a balance weight and a balance weight gear assembly are attached to the upper portion of the upper arm and driven by the third motor in order to keep momental balance of the lower arms when the lower arm is moved relative to the upper arm.

Further, a fourth motor and a fourth gear assembly are provided for further moving the shoulder frame right and left.

The pivotal center of said first gear assembly and the pivotal center of said balance weight gear assembly lie on a straight lie. The first, second and third motions are disposed above the pivotal center of said first gear assembly and the third motor is disposed over the upper arm. The balance weight is disposed above the pivotal center of said first gear assembly.

In summary, in the joint mechanism for a manipulator according to the present invention, each motor is arranged on the shoulder frame of the manipulator, and each joint (gear assembly) is driven independently in multi-directions without interference in movement with other joints (gear assemblies) in the manner similar to human shoulder and elbow joints.

BRIEF DESCRIPTON OF THE DRAWINGS

The features and advantages of the joint mechanism for a manipulator according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENT

Figure 1:
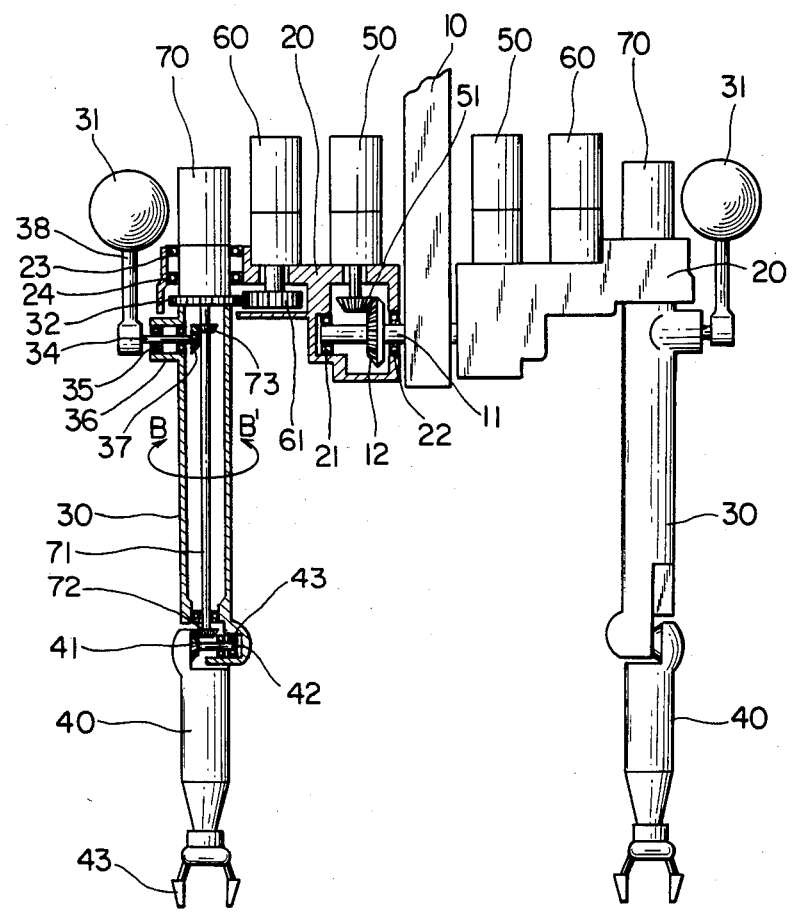
FIG. 1 is a front view showing a first embodiment of the joint mechanism of a manipulator according to the present invention, in which only the righthand portion thereof is shown by a cross-sectional view.

FIG. 1 shows a first embodiment of the present invention. In FIG. 1, a pair of arms and two sets of arm driving joint mechanisms are shown. However, only the lefthand arm and lefthand joint mechanisms of the manipulator (when seen from the back) will be described hereinafter, because the righthand arm and righthand joint mechanisms are the same as the lefthand ones being disposed mirror symmetrically.

Figure 2:
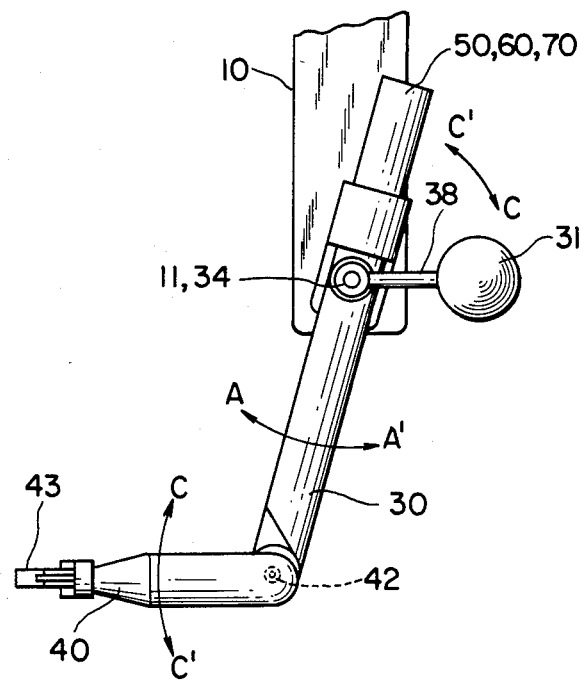
FIG. 2 is a side view of the joint mechanism shown in FIG. 1.

In this first embodiment, the joint mechanism serves to drive the arm in three operational modes: pivotal movement of upper and lower arms in the back and forth (A—A') direction (perpendicular to the plane of FIG. 1) as shown in FIG. 2, pivotal movement of upper and lower arms in the (B—B') direction as shown in FIG. 1; and pivotal movement of only the lower arm in the back and forth or up and down (C—C') direction as shown in FIG. 2.

The joint mechanism shown in FIG. 1 is roughly made up of a manipulator base 10, a shoulder frame 20, an upper arm 30, a lower arm 40, a balance weight 31, a first actuator 50 for a first drive mode of the (A—A') direction, a second actuator 60 for a second drive mode of the (B—B') direction, and a third actuator 70 for a third drive mode of the (C—C') direction.

Each actuator 50, 60 or 70 is composed of a motor, a speed reducing gear, etc. and mounted on the shoulder frame 20. The balance weight 31 is mounted on the upper side of the upper arm 30 so as to keep weight balance of the arm relative to three actuators and other elements.

The manipulator base 10 is provided with a shoulder frame support axle 11 fixed thereto for supporting the shoulder frame horizontally. This support axle also supports the whole shoulder assembly. A bevel gear 12 is fixed to this shoulder frame support axle 11 being housed within the shoulder frame 20. The shoulder frame 20 is pivotably supported by the shoulder frame support axle 11 via a pair of bearings 21 and 22. The first actuator 50 is provided with a bevel gear 51 being in mesh with the bevel gear 12 within the shoulder frame 20. Therefore, when the first actuator 50 such as a motor drives the bevel gear 51 in either direction, this bevel gear 51 moves along the circumference of the fixed bevel gear 12, so that the whole shoulder assembly is pivoted or swung with the stationary shoulder frame support axle 11 as its center in the back and forth (A—A') direction as depicted in FIG. 2.

The second actuator 60 is provided with a spur gear 61 housed within the shoulder frame 20. A spur gear 32 is fixed to top of the upper arm 30 in mesh with the spur gear 61. Therefore, when the second actuator 60 such as a motor drives the spur gear 61, the spur gear 32 is rotated, so that the whole arm assembly including the upper arm 30, the lower arm 40, the third actuator 70, and the balance weight 31 are all pivoted in either (B—B') direction as depicted in FIG. 1.

The third actuator 70 is pivotally supported via two bearings 23 and 24 by the shoulder frame 20. This third actuator 70 is fixedly mounted on the spur gear 32. A long actuator shaft 71 extends within the upper arm 30 being loosely passed through a center hole (not shown) formed in the spur gear 32. A small bevel gear 72 is fixed to the lower end of this shaft 71. This bevel gear 72 is in mesh with another small bevel gear 41 fixed to the upper end of the lower arm 40. A lower arm support axle 42 is fixed to the center of the bevel gear 41 at one end thereof and pivotably supported at its lower end via a set of bearings 43. Therefore, when the third actuator 70 such as a motor rotates the shaft 71, the bevel gear 72 is rotated, so that the lower arm 40 is pivoted or swung via the bevel gear 41 in the back and forth or up and down (C—C') direction as depicted FIG. 2. Here, it should be noted that since the drive shaft 71 is loosely passed through the center hole of the spur gear 32, the spur gear 32 is never driven by the third actuator 70 itself.

Further, another small bevel gear 73 is fixed to the shaft 71 near the top of the upper arm 30. A balance weight axle 34 is pivotably supported via two bearings 35 disposed in a horizontally cylindrical upper arm frame 36. A small bevel gear 37 is fixed to the balance weight axle 34 at one end thereof in mesh with the bevel gear 73. A balance weight rod 38 is fixed to the balance weight axle 34 at the other end thereof. Therefore, when the third actuator 70 rotates the shaft 71 to pivot the lower arm 40 with the axle 42 as its center, the balance weight 31 is also pivoted in the same direction as that of the lower arm 40, so that the momental balance due to weight between the lower arm 40 and the balance weight 31 is maintained as depicted in FIG. 2.

Here, since the two bevel gears 41 and 72 for pivoting the lower arm 40 are the same in diameter and module as the bevel gears 37 and 73 for pivoting the balance weight 31, the pivot angles of both are equal to each other for keeping the momental balance between the lower arm 40 and the balance weight 31. Further, it should be noted that the shoulder frame support axle 11 about which the shoulder frame 20 is pivoted back and forth is located at the same height on a common plane as the balance weight support axle 34 about which the balance weight 31 is pivoted.

Further, since the shoulder frame support axle 11 about which the shoulder frame 20 is pivoted back and forth and the shaft 71 about which both the arms 30 and 40 are pivoted in either direction intersect to each other on common plane and since the fingers 44 are located on the extension line of the shaft 71, the above arrangement permits the movement similar to that of human shoulder joint and elbow joint.

In the above description, the first gear assembly including two bevel gears 12 and 51 and the second gear assembly including two spur gears 61 and 32 operate as a shoulder joint, while the third gear assembly including two bevel gears 72, 41 operates as an elbow joint.

Figure 3:
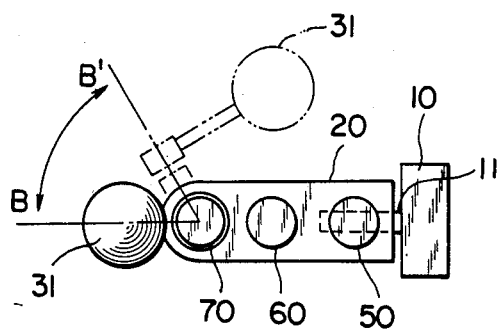
FIG. 3 is a top view of the joint mechanism shown in FIG. 1.

FIG. 3 shows the case where both the upper and lower arms 30 and 40 are pivoted in the (B—B') direction by the second actuator 60 and further only the lower arm 40 (not shown) is pivoted frontward and therefore the balance weight 31 is pivoted rearward to keep the momental balance between the lower arm 40 and the balance weight 31. Therefore, the balance weight 31 is effective when the lower arm 40 is pivoted in either direction. In this embodiment, it is necessary to decide the magnitude of balance weight 31 and the length of the balance rod 38 under consideration of various factors as weights and lengths of the upper and lower arms 30 and 40 and the actuators 50, 60 and 70. Further, the balance weight 31 is disposed near the shoulder portion so as not to obstruct the way of operation area of the manipulator. In humans, the arm is moved back and forth or twisted with the shoulder as its center. Although the above motion is ideal, it is impossible to realize the above motion in robots or manipulators. The aim of this invention is to realize the arm motion as closely to the human motion as possible.

As well understood by the above description, since the three pivotal movements of the arm (in the (A—A') direction that the arm is pivoted back and forth about the shoulder frame support axle 11, in the (B—B') direction that the arm is pivoted clockwise or counterclockwise about the shaft 71, and in the (C—C') direction that the lower arm is pivoted back and forth or up and down about the lower arm support axle 42 are all achieved independently, it is possible to move, stop or control each actuator 50, 60 or 70 separately.

Further, the reference numeral 44 shown in FIG. 2 denotes fingers of the manipulator. These fingers are driven by another actuator (not shown) housed within the lower arm 40. The detail of the finger actuator are not described herein because not being directly related to the present invention.

Figure 4:
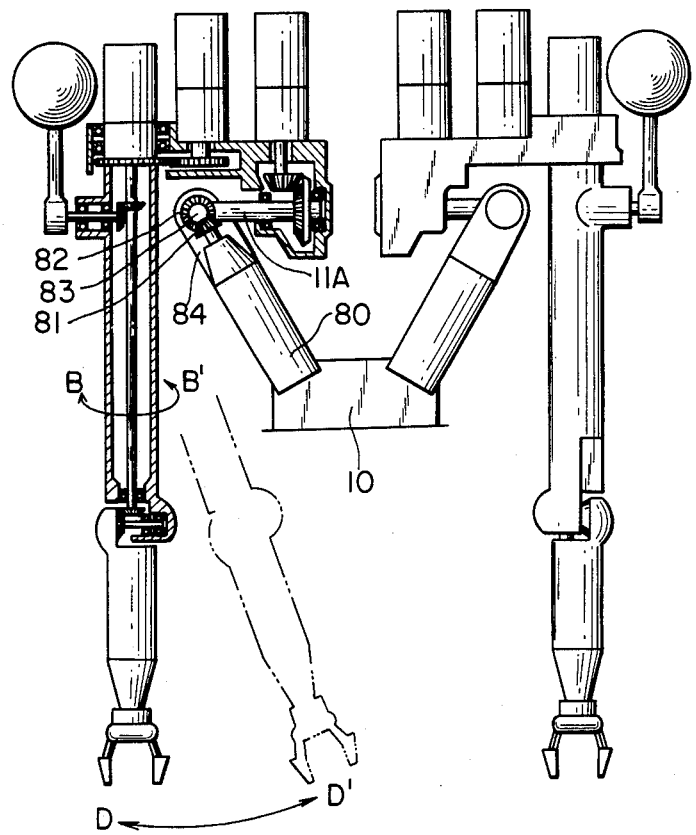
FIG. 4 is a front view showing a second embodiment of the joint mechanism of a manipulator according to the present invention, in which only the righthand portion thereof is shown by a cross-sectional view.

FIG. 4 shows a second embodiment of the present invention. In this embodiment, the joint mechanism serves to drive the arm in four operational modes: the pivotal movement of the upper and lower arms in the back and forth (A—A') direction, the pivotal movement of upper and lower arm in the clockwise or counterclockwise (B—B') direction, the pivotal movement of only lower arm in the back and forth or up and down (C—C') direction, and additionally the pivotal movement of the upper and lower arms in right and left (D—D') direction as depicted in FIG. 4.

In FIG. 4, the joint mechanism further includes a fourth actuator 80 to pivot the shoulder frame 20 in the (D—D') direction. The fourth actuator 80 such as a motor is provided with a bevel gear 81. Another bevel gear 82 is pivotably supported by a second shoulder frame support axle 82 fixed to a base plate 84 extending from the base 10 in mesh with the bevel gear 81. The first shoulder frame support axle 11A is fixed to the bevel gear 82.

In the first embodiment shown in FIG. 1, the shoulder frame support axle 11 is fixed to the base 10. However, in this second embodiment shown in FIG. 4, the first shoulder frame support axle 11A is supported by the second shoulder frame support axle 83 and pivoted around the second shoulder frame support axle 83 by two bevel gears 81 and 83 when the fourth actuator 80 move, so that the whole shoulder frame including the arms is pivoted or swung in the (D—D') direction as depicted in FIG. 4.

As described above, the joint mechanism for manipulators according to the present invention has the following features:

(1) The three or four actuators and other elements are concentratively disposed on the shoulder section of the mechanism without obstruction of the operation range of the manipulator.

(2) The three or four pivotal movements can be controlled independently by a simple control system without motional interference with each other.

(3) The arrangement and movement of gear assemblies are similar to the shoulder and elbow joints of human.

(4) The operation is free, natural and easy to handle the manipulator on the basis of the operators sense without movement restriction.

(5) The horizontal axis of back and forth pivotal movement of the arm is perpendicular to the vertical axis of clockwise or counterclockwise movement of the arm on a single plane as in a human shoulder and further the fingers are located on an extension of the vertical axis of the clockwise movement, so that the manipulatability can be improved in the manipulator.

(6) The balance weight is effective when the lower arm is pivoted up and down without obstruction of way of manipulation operation.

(7) The balance weight is disposed near the shoulder section without obstruction of way of manipulation operation.

What is claimed is:

1. A joint mechanism of a manipulator, comprising:
   (a) a manipulator base;
   (b) a shoulder frame support axle fixedly supported on the manipulator base;
   (c) a shoulder frame rotatably mounted on the shoulder frame support axle;
   (d) an upper arm movably connected to the shoulder frame and having a transverse axis rotatable about the shoulder frame support axle;
   (e) a lower arm pivotably connected to the upper arm;
   (f) a first motor having a first drive shaft and fixed to the shoulder frame;
   (g) a second motor having a second drive shaft and fixed to the shoulder frame, the second drive shaft being in parallel to the longitudinal axis of the upper arm, a drive of the second motor being independent of a drive of the first motor;
   (h) a third motor fixed to the upper arm and movably mounted on the shoulder frame, the third motor having a third drive shaft extending on the longitudinal axis of the upper arm, a drive of the third motor being independent of drives of the first and second motors;
   (i) a first drive assembly housed within the shoulder frame and receiving power from the first motor so as to pivot the shoulder frame in back and forth (A—A') direction about the stationary shoulder frame support axle;
   (j) a second drive assembly housed within the shoulder frame and receiving power from the second motor so as to rotate the upper and lower arms in clockwise and counterclockwise (B—B') direction within 360° about the longitudinal axis of the upper arm; and
   (k) a third drive assembly housed within the lower arm and receiving power from the third motor so as to pivot the lower arm in a back and forth or up and down (C—C') direction relative to the upper arm.

2. The joint mechanism as set forth in claim 1 which further comprises:
   (a) a balance weight attached to an upper portion of the upper arm; and
   (b) a balance weight drive assembly housed within the upper arm for moving said balance weight in conjunction with the movement of the lower arm in such a direction that a momental balance can be kept in the upper and lower arms when the lower arm is moved relative to the upper arm.

3. The joint mechanism as set forth in claim 1, which further comprises:
   (a) a fourth motor having a fourth drive shaft and fixed up to the manipulator base; and
   (b) a fourth drive assembly receiving power from the fourth motor so as to pivot the shoulder frame in right and left (D—D') direction together with the upper and lower arms when said fourth motor is directly driven by the fourth drive shaft of said fourth motor.

4. The joint mechanism as set forth in claim 1, wherein said first drive assembly comprises:
(a) a first bevel gear fixed to said shoulder frame support axle;
(b) a second bevel gear in mesh with said first bevel gear, said second bevel gear being driven by said first motor to move the shoulder frame back and forth together with the upper and lower arms.

5. The joint mechanism as set forth in claim 1, wherein said second drive assembly comprises:
(a) a first spur gear fixed to the upper arm, the axis of the first spur gear being coaxial with the longitudinal axis of the upper arm;
(b) a second spur gear in mesh with said first spur gear, said second spur gear being driven by said second motor to move the upper and lower arms clockwise and counterclockwise.

6. The joint mechanism as set forth in claim 1, wherein said third drive assembly comprises:
(a) a lower arm support axle fixed to the lower arm, for pivotably supporting the lower arm at lower end of the upper arm;
(b) a third bevel gear fixed to said lower arm support axle;
(c) a fourth bevel gear in mesh with said third bevel gear, said fourth bevel gear being driven by said third motor to move the lower arm back and forth or up and down.

7. The joint mechanism as set forth in claim 2, wherein said balance weight drive assembly comprises:
(a) a balance weight support axle for movably supporting said balance weight at upper end of the upper arm;
(b) A fifth bevel gear fixed to said balance weight support axle;
(c) a sixth bevel gear in mesh with said fifth bevel gear, said sixth bevel gear being driven by said third motor to move the balance weight back and forth in such a direction that a momental balance can be kept in the upper and lower arms when the lower arm is moved relative to the upper arm.

8. The joint mechanism as set forth in claim 3, wherein said fourth drive assembly comprises:
(a) a seventh bevel gear fixed to said shoulder frame support axle;
(b) a second shoulder frame support axle fixed to the manipulator base perpendicular to said first shoulder frame support axle for movably supporting said first shoulder frame support axle via said seventh bevel gear; and
(c) an eighth bevel gear in mesh with said seventh bevel gear, said eighth bevel gear being driven by said fourth motor to move the shoulder frame right and left together with the upper and lower arms.

9. The joint mechanism as set forth in claim 2, wherein a pivotal center of said first drive assembly and a pivotal center of said balance weight drive assembly lie on a straight line.

10. The joint mechanism as set forth in claim 1, wherein said first, second and third motors are disposed above a pivotal center of said first drive assembly and said third motor is disposed over the upper arm.

11. The joint mechanism as set forth in claim 2, wherein said balance weight is disposed above the pivotal center of said first drive assembly.

* * * * *